Patented Feb. 21, 1950

2,498,432

UNITED STATES PATENT OFFICE 2,498,432

1-BRANCHED LOWER ALKYL-4-PHENYL-4-ACYLOXY-PIPERIDINES AND THEIR ACID ADDITION SALTS

John Lee, Essex Fells, N. J., assignor to Hoffmann-La Roche Inc., Nutley, N. J., a corporation of New Jersey No Drawing. Application July 8, 1946,
Serial No. 682,131

7 Claims. (Cl. 260—294)

This invention relates to new piperidine derivatives and their method of manufacture. The compounds coming within the scope of the present invention can be represented by the following formula:

(A)
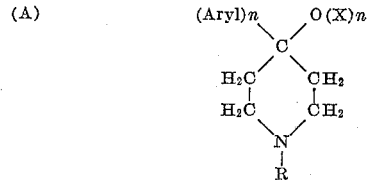

In the above formula, X represents hydrogen, lithium, MgHals as, for example, MgCl, MgBr and MgI, or an acyl radical, as for example, acetyl, propionyl, butyryl, benzoyl, furoyl, succinoyl and the like; R represents a lower branched alkyl radical containing at least three carbon atoms as, for example, isopropyl, secondary-butyl, isobutyl, secondary-amyl, isoamyl and the like; $n$ stands for zero or 1; aryl represents an aryl group as, for example, phenyl or naphthyl.

The compounds of formula A, where X is other than lithium or MgHal can be in the form of salts of organic or inorganic acids as, for example, tartrates, malates, citrates, ethanesulfonates, isethionates, sulfates, hydrochlorides, and the like.

In the above formula, when $n$ is zero, the compounds are 1-branched alkyl-4-piperidones which can be represented by the following formula:

(I)
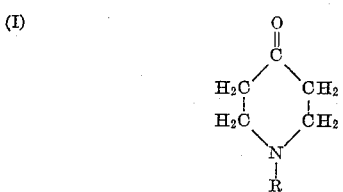

When $n$ is 1 and X is lithium, the compounds are 1-branched alkyl-4-piperidine lithium complexes which can be represented by the following formula:

(II)
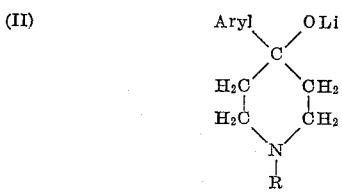

When $n$ is 1 and X is hydrogen, the compounds can be designated as 1-branched alkyl-4-piperidinols which can be represented by the following formula:

(III)
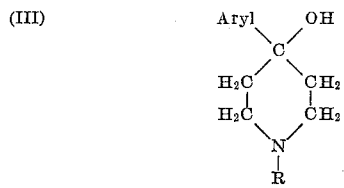

When $n$ in formula A is 1 and X is acyl, the compounds can be designated as 1-branched alkyl-4-acyloxy-piperidines which can be represented by the following formula:

(IV)
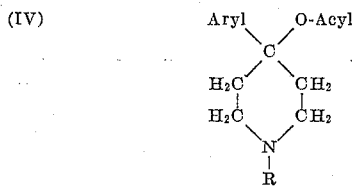

When $n$ in formula A is 1 and X is MgHal, the compounds can be represented by the following formula:

(V)
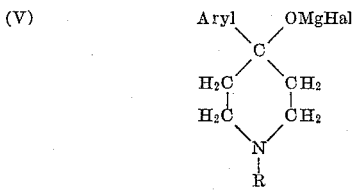

In each of Formulas I, II, III, IV and V, R has the same significance as in Formula A.

The compounds as represented by Formula I are highly useful for the preparation of compounds of Formula IV. The compounds of the claims of Formula I have properties which render them superior to compounds where the 1-substituent is an unbranched or open chain alkyl radical. For example, it has been found that the 1-n-alkyl-4-phenyl-acyloxy-piperidines prepared according to the method described by Jensen and Lundquist (Dansk. Tidsskr. Farm., 17, 173–182), while characterized by high analgesic activity, are unsuitable for pharmaceutical use on account of their instability in aqueous solution. On the other hand, it has been found that when 1-branched alkyl-4-piperidones of the type of compound I as, for example, α- or β-methyl-alkyl-4-piperidones are used in the synthesis of compounds of Formula IV; namely, α- or β-methyl-alkyl-4-aryl-4-acyloxy-piperidines, that the latter are characterized by a considerable stability in water, while retaining their analgesic and antispasmodic activity. For example, when 1-n-alkyl-4-aryl-4-phenyl-propionoxy-piperidine hydrochlorides in aqueous solution are maintained at 40° C. for as short a period as 30 days, about 50 per cent of the activity of the compounds is lost due to hydrolysis of the acyloxy residue. On the other hand, it has been found that $\alpha$- or $\beta$-methyl-alkyl-4-phenyl - 4 - propionoxy - piperidine hydrochlorides of Formula IV, as, for example, 1-isopropyl-4-phenyl - 4 - propionoxy-piperidine hydrochloride, and 1-isobutyl-4-phenyl-4-propionoxy-piperidine hydrochloride, are unchanged under these conditions of storage and are well suited for pharmaceutical use. The following table is illustrative of the outstanding stability of the 1-branched alkyl-4-phenyl-4-acyloxy-piperidine compounds as compared with the corresponding 1-n-alkyl derivatives.

TABLE I

*Comparative stability of 1-n-alkyl and 1-branched-alkyl 4-phenyl-propionoxy-piperidine hydrochlorides*

| 1-alkyl group | Loss of activity [1] at 40° C.—500 hrs. | Loss of activity [1] at 25° C.—6 mos. |
| --- | --- | --- |
| | *Percent* | *Percent* |
| Ethyl | 50 | 40 |
| Allyl | 30 | 50 |
| Butyl | 50 | 20 |
| Isopropyl | 0.0 | 0.0 |
| Isobutyl | 0.0 | 0.0 |

[1] As determined by: (*a*) diminution of analgesic activity, and (*b*) diminution of antispasmodic activity.

The 1-branched-alkyl-piperidones of Formula I can be prepared by reacting a branched alkyl primary amine with alkyl acrylate, condensing the resulting $\beta,\beta'$-dicarbalkoxy-diethyl-branched-alkylamine to form the 1-branched alkyl-3-carbalkoxy-4-piperidone, hydrolyzing and decarboxylating the latter to form the piperidone of Formula I. The preparation of such piperidones is illustrated by the following examples.

EXAMPLE 1

684 cc. of isopropylamine (8 moles) is dissolved in 400 cc. of ethanol. To this, 1732 cc. of ethyl acrylate (16 moles) is added in portions. The solution is kept at room temperature for one week and the alcohol along with the unreacted isopropylamine and ethyl acrylate is distilled off in vacuum from a steam bath. On distillation, the product $\beta,\beta'$-dicarbethoxy-diethyl-isopropylamine (B. P. 110° C./6 mm.) is obtained.

In a 3-neck, round-bottom flask with stirring mechanism, dropping funnel and reflux condenser are placed 500 cc. of dry toluene and 41 grams of sodium powder with stirring. The flask contents are brought to 90° C. on an oil bath and 451 grams of $\beta,\beta'$-dicarbethoxy-diethyl-isopropylamine are added dropwise. As the condensation proceeds, the sodium salt of 1-isopropyl-3-carbethoxy-piperidone-4 precipitates out. After the addition is completed, the flask is cooled and 500 cc. of water added. The toluene layer separates and the aqueous layer is acidified with hydrochloric acid to approximately a pH of 3.0. The solution of 1-isopropyl-3-carbethoxy-piperidone-4-hydrochloride is refluxed until a drop of solution gives only a very faint color with ferric chloride. Most of the water is distilled off in vacuum and the residue is alkalinized with 50 per cent of sodium hydroxide solution to about a pH of 11. The solution is extracted with ether, the ether solution dried and the ether distilled off. The residue obtained is 1-isopropyl-piperidone-4, which boils at 103° C./25 mm.

EXAMPLE 2

In a similar manner to that described in Example 1, 507 cc. of secondary butylamine (5 moles) and 1087 cc. of ethyl acrylate (10 moles) are reacted to form $\beta,\beta'$-dicarbethoxy-diethyl-secondary butylamine, which has a B. P. of 144° C./2 mm. 400 grams of this diester is cyclized in a manner similar to the procedure employed in Example 1 with 34.5 grams of sodium and yields after hydrolysis with hydrochloric acid, 1-secondary-butyl-piperidone-4 having a B. P. of 112°/23 mm.

EXAMPLE 3

365 grams of isobutylamine, 1000 grams of ethyl acrylate and 500 cc. of ethyl alcohol are mixed and kept at room temperature for one week. The alcohol is distilled off and the residue fractionated under vacuum. The $\beta,\beta'$-dicarbethoxy-diethyl-isobutylamine so obtained boiled at 133° C./1 mm. 564 grams of this diester are added dropwise to a suspension of 46 grams of sodium powder in 1300 cc. of toluene in a 3-neck flask provided with a reflux condenser, stirrer and dropping funnel. As the condensation proceeds, the insoluble sodium salt of the ethyl ester separates. The reaction mixture was then hydrolyzed with hydrochloric acid following the procedure as in Example 1 to give 1-isobutyl-4-piperidone having a B. P. of 105°/22 mm. pressure.

EXAMPLE 4

In a similar manner to that of Example 1, but starting with secondary-amylamine and isoamylamine there can be obtained 1-secondary-amyl-4-piperidone and 1-isoamyl-4-piperidone, respectively.

The preparation of the lithium complexes as represented by Formula II can be carried out by reacting the 4-piperidones as represented by Formula I with lithium-aryls as, for example, lithium-phenyl or lithium-naphthyl. The process of reacting lithium-aryls with 4-piperidones comprises the subject matter of application Serial No. 682,134, filed July 8, 1946. In general, the lithium-aryl compounds can be formed by reacting lithium metal or a lithium compound capable of transferring lithium and a compound having an exchangeable halogen group as, for example, bromobenzene. The reaction between the lithium-aryl compound and the piperidone compound takes place readily and may be carried out in the presence of an inert organic solvent as, for example, benzene, ether, dioxane and the like.

To form the piperidinols as represented by Formula III, the lithium piperidine complexes so obtained are hydrolyzed with water, which may be either rendered acid as with hydrogen chloride, or alkaline as, for example, with sodium hydroxide. The lithium atom is split off by the hydrolysis resulting in the piperidinol compound as represented by Formula III.

To prepare the acyloxy derivatives as represented by Formula IV, the piperidinols of Formula III are acylated with any suitable acylating agent as, for example, acyl halides or acyl anhydrides. Catalysts such as sulfuric acid or sodium acetate may be employed. The acylation may also be carried out in the presence of acid binding agents such as pyridine or potassium carbonate.

The Grignard complexes of Formula V are prepared by reacting the piperidones of Formula I with Grignard reagents represented by the formula Aryl MgHal.

Instead of first hydrolyzing the lithium piperidine complex to the piperidinol and then acylating the latter, the acyloxy derivatives can be obtained by direct acylation of the lithium complex as represented by Formula II. This is the preferred method of preparing the compounds of Formula IV since the direct acylation offers the advantages that it eliminates a number of manipulations and the isolation and purification of the intermediate piperidinol.

The following examples will serve to illustrate the method employed for converting compounds of Formula I into compounds of Formulas II, III, IV, and V.

EXAMPLE 5

In a round-bottom flask provided with stirrer, dropping funnel, condenser and a gas inlet for keeping the system under nitrogen, 200 cc. of dry ether is introduced and 4.6 grams of lithium cut into thin strips are added. 52 grams of bromobenzene in 50 cc. of dry ether are added dropwise and after the addition, the mixture is refluxed for two hours. The ether solution is then cooled to −20° C. and 35 grams of 1-isopropyl piperidone-4 in 35 cc. of dry ether are added dropwise. After the addition, the temperature is permitted to rise to 0° C. There is formed 1 - isopropyl - 4-phenyl-4-lithiumoxy - piperidine complex which can be recovered from the ether.

To form the piperidinol there is added to the reaction mixture containing the lithium complex, dilute hydrochloric acid until the solution is acid to Congo red. The aqueous layer is separated and basified with 20 per cent sodium hydroxide to a pH of 10. The mixture is then extracted with ether, the ether solution dried over potassium carbonate and the ether distilled off. The residue is dissolved in 75 cc. of hot petroleum ether (B. P. 35–60° C). The product, 1-isopropyl-4-phenyl-4-hydroxy-piperidine, crystallizes out on cooling and has an M. P. of 83° C. On dissolving it in ether and passing dry hydrochloric acid gas through the solution, the hydrochloride of the alcohol separates, M. P. 231° C.

From the 1-isopropyl-4-phenyl-4-hydroxy-piperidine, the 1-isopropyl-4-phenyl-4-propionoxy-piperidine and its hydrochloride can be prepared as follows: 32 grams of 1-isopropyl-4-phenyl-4-hydroxy-piperidine are dissolved in 70 cc. of pyridine and 90 cc. of propionic anhydride are added. The solution is refluxed for 3 hours, the pyridine and excess propionic anhydride are distilled off in vacuo and the residue basified with 5 per cent sodium hydroxide. The oily product obtained is extracted with ether, dried over potassium carbonate and the ether solution filtered. Dry hydrochloric acid gas is bubbled into the solution, the hydrochloride is filtered off, dried in a vacuum dessicator over alkali and then crystallized from acetone-methanol mixture. The product, 1-isopropyl-4-phenyl-4-propionoxy-piperidine hydrochloride, obtained has an M. P. of 213-4° C.

EXAMPLE 6

Following the same procedure as described above, but starting with 1-secondary-butyl-4-piperidone, 1-secondary-amyl-4-piperidone, 1-isoamyl-4-piperidone and 1-isobutyl-4-piperidone, there are obtained the corresponding lithium complexes and the following compounds: 1-secondary-butyl-4-phenyl-4-hydroxy-piperidine, 1-secondary - amyl-4-phenyl-4-hydroxy-piperidine, 1-isoamyl-4-phenyl-4-hydroxy-piperidine, 1-isobutyl-4-phenyl-4-hydroxy-piperidine, as well as the following compounds: 1-secondary-butyl-4-phenyl-4-(acetoxy, propionoxy, butyroxy, succinoxy, benzoxy, furoxy,) piperidines, 1-secondary-amyl-4-phenyl-4-(acetoxy, propionoxy, butyroxy, succinoxy, benzoxy, furoxy,) piperidines, 1-isoamyl-4-phenyl-4-(acetoxy, propionoxy, butyroxy, succinoxy, benzoxy, furoxy,) piperidines, 1-isobutyl-4-phenyl-4-(acetoxy, propionoxy, butyroxy, succinoxy, benzoxy, furoxy,) piperidines and their salts.

Illustrative of the method of obtaining the compounds of Formula IV by direct acylation of the lithium complexes of Formula II are the following examples.

EXAMPLE 7

In a 3-neck reaction flask equipped with a stirrer, reflux condenser, and dropping funnel and provided with suitable arrangements for operating under an inert atmosphere, 8.4 grams of lithium wire are suspended in 250 cc. of ether and reacted with 100 grams of bromobenzene. The reaction starts spontaneously and is complete within 2–3 hours. The contents of the flask are cooled with ice water and 52 grams 1-isopropyl-4-piperidone in 100 cc. of dried benzol are added. The mixture is refluxed for 1–1½ hours and the apparatus then arranged for distillation and the ether removed by allowing the temperature to rise to 55–60° C. An additional 100 cc. of benzol is then added, the reaction is then cooled to 0° C. and 100 cc. of acetic anhydride in 200 cc. of dried benzol is added. A yellowish-green precipitate forms, forming a thick mixture which, after dilution of a further liter of benzene, is refluxed for 30 minutes and allowed to stand overnight. The mixture is then cooled to 0° C. and decomposed with 100 cc. of water and finally 100 cc. of hydrochloric acid mixed with 100 grams of ice are added. The insoluble hydrochloride which separates is redissolved by the addition of 4 liters of water and the mixture is extracted with ether. The ether layer is discarded, the aqueous solution is basified to pH 10 with sodium hydroxide solution and extracted with ether. The ether solution is dried with sodium sulfate, the ether removed and the residue fractionated. The product obtained is 1-isopropyl-4-phenyl-4-acetoxy - piperidine, boiling at 149–151° C./3-4 mm. pressure. It crystallizes from low boiling benzine (30–60° C.) and melts at 75–76° C. On treatment with hydrogen chloride and crystallization from acetone-methanol solution, its hydrochloride, which melts at 205–206° C., is obtained.

EXAMPLE 8

In a manner similar to the previous example, the lithium complex is formed from the same amounts of phenyl-lithium and 1-isopropyl-4-piperidone and the reaction mixture is reacted with 80 cc. of propionic anhydride in 250 cc. of benzol. The reaction mixture is refluxed for 30–40 minutes and then worked up in the same manner as described in said example. On fractionation, 1-isopropyl-4-phenyl - 4 - propionoxy-piperidine, B. P. 140–142° C./1-2 mm., is obtained. This compound can be transformed by treatment with hydrogen chloride to its hydrochloride which on crystallization from isopropyl alcohol gives a product melting at 208–209° C. 1-isopropyl-4-phenyl-4-propionoxy-piperidine is disclosed but not claimed in the patent application of John Lee, Serial No. 588,409, filed April 14, 1945, now abandoned.

EXAMPLE 9

Following the procedure given in the last 2 examples, but employing 1-secondary-butyl-4-piperidone, 1-secondary-amyl-4-piperidone, 1-isoamyl-4-piperidone and 1-isobutyl-4-piperidone, there can be obtained the 1-(secondary-butyl-, secondary-amyl-, isoamyl-, and 1-isobutyl-) 4-phenyl-4-(acetoxy and propionoxy)-piperidines and their hydrochlorides, respectively.

Instead of preparing the compounds of Formula IV by acylation of compounds of Formulas II and III, the compounds of Group IV may also be prepared by acylation of the Grignard complex obtained by Grignardizing the compounds of Group I. The following is an example of this procedure.

EXAMPLE 10

47 grams of bromobenzene are added to a 3-neck flask containing 7.2 grams of magnesium turnings covered with 100 cc. of ether. After formation of the Grignard reagent, the flask is cooled in an ice bath and 28 grams of 1-isopropyl-piperidone-4 in 100 cc. of dry ether is added dropwise with stirring. The ether is then distilled off and 150 of dry benzene added. 39 grams of propionic anhydride are added dropwise with stirring. The contents are then refluxed for 2 hours, the solution is cooled and dilute hydrochloric acid is added. The acid layer is separate and basified, the oil is extracted with ether, hydrogen chloride is bubbled into the dried ether solution to precipitate the hydrochloride of 1-isopropyl-4-phenyl-4-propionoxy-piperidine.

Alternatively, the reaction product of the Grignard reagent and the ketone may be hydrolyzed to the piperidinol which can be isolated and converted to acyloxy compounds in the manner described.

While the above examples illustrate the invention in terms of hydrochloride salts, it is to be understood that by the employment of other salt-producing agents such as dimethyl sulfate, diethyl sulfate, ethyl-p-toluene sulfonate, and the like, the corresponding quaternary salts of the above-mentioned compounds may be obtained. Likewise, while the above examples illustrate the invention in terms of the acetoxy, and propionoxy derivatives; primarily, it is to be understood that by employing other esterifying agents such as the butyryl chloride, benzoyl chloride, succinic anhydride, furoyl chloride and the like, the corresponding acyl derivatives may be obtained.

I claim:

1. 1-branched lower alkyl-4-phenyl-4-lower fatty acyloxy-piperidines and their acid addition salts.

2. 1-isopropyl-4-phenyl-4-lower fatty acyloxy-piperidines and their acid addition salts.

3. 1-isopropyl-4-phenyl-4-propionoxy - piperidine and its acid addition salts.

4. 1-isopropyl-4-phenyl-4-propionoxy - piperidine hydrochloride.

5. 1-secondary butyl-4-phenyl-4 - propionoxy-piperidine and its acid addition salts.

6. 1-isopropyl-4-phenyl-4-acetoxy - piperidine and its acid addition salts.

7. 1-isopropyl-4-phenyl-4-acetoxy - piperidine hydrochloride.

JOHN LEE.

REFERENCES CITED

The following references are of record in the file of this patent:

UNITED STATES PATENTS

| Number | Name | Date |
|---|---|---|
| 1,714,180 | McElvain | May 21, 1929 |
| 2,411,664 | Miescher et al. | Nov. 26, 1946 |

FOREIGN PATENTS

| Number | Country | Date |
|---|---|---|
| 60,592 | Denmark | Feb. 15, 1943 |

OTHER REFERENCES

Bolyard et al., J. Amer. Chem. Soc., vol. 51, p. 924 (1929).

Morsch, Monatsh fur Cham., vol. 63, pp. 222, 229–233 (1933) (complete article, pp. 220–235).

Gilman, Organic Chemistry, Wiley & Sons, N. Y. (1938), pp. 430 and 580.

Jensen et al., Dansk Tiddskrift for Farmaci, vol. 17 (1943), pp. 173–182.

Gilman, et al., J. Amer. Chem. Soc., vol. 66, p. 840 (1944).